United States Patent [19]
Ishimura

[11] Patent Number: 5,892,459
[45] Date of Patent: *Apr. 6, 1999

[54] PROCESSING CIRCUIT FOR INPUT SIGNAL FROM KEY OR REMOTE-CONTROLLER

[75] Inventor: Shizuka Ishimura, Ora-gun, Japan

[73] Assignee: Sanyo Electric Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[*] Notice: The term of this patent shall not extend beyond the expiration date of Pat. No. 5,

[21] Appl. No.: 600,315

[22] Filed: Feb. 12, 1996

[30] Foreign Application Priority Data

Feb. 16, 1995 [JP] Japan .................................. 7-028124

[51] Int. Cl.$^6$ ..................................................... H04B 1/06
[52] U.S. Cl. ............................... 340/825.72; 340/825.69;
340/825.25; 340/825.22; 340/825.34; 340/825.07;
340/825.31; 340/825.56; 341/176; 341/20;
341/22; 341/26; 348/734
[58] Field of Search ......................... 340/825.72, 825.69,
340/825.25, 825.22, 825.34, 825.07, 825.31,
825.56; 341/176, 20, 22, 26; 348/734

[56] References Cited

U.S. PATENT DOCUMENTS

| | | | |
|---|---|---|---|
| 4,246,611 | 1/1981 | Davies | 358/194.1 |
| 4,408,511 | 10/1983 | Deforeit | 341/26 |
| 4,857,898 | 8/1989 | Smith | 340/825.69 |
| 4,866,434 | 9/1989 | Keenan | 340/825.69 |
| 5,752,184 | 5/1998 | Ishimura | 455/352 |

*Primary Examiner*—Michael Horabik
*Assistant Examiner*—Yves Dalencourt
*Attorney, Agent, or Firm*—Loeb & Loeb LLP

[57] ABSTRACT

A key scanning circuit scans a key matrix circuit to generate key input data as for key operations. A remote control decoder decodes an encoded signal, which has been output from a remote control transmitter and received by a remote control receiving circuit, to generate remote control data. A transmission register selectively stores either the key input data or remote control data. By transmitting the data stored in the single transmission register, it is possible to transmit any one of the key input data and remote control data to the microcomputer.

10 Claims, 3 Drawing Sheets

PROCESSING CIRCUIT FOR INPUT SIGNAL FROM KEY OR REMOTE-CONTROLLER

BACKGROUND OF THE INVENTION

1. Field of the Invention

The present invention relates generally to a key input processing circuit for processing key input data from a key matrix circuit and for transmitting the processed data to a controller, such as a microcomputer, and more particularly to a key input processing circuit wherein a remote control signal can be incorporated and transmitted to the controller.

2. Description of the Prior Art

As shown in FIG. 1, a conventional key input processing circuit 1 comprises one LSI, to which a key matrix circuit 2 is directly connected, as well as a microcomputer 3, which is connected to the LSI via a number of serial communication lines 4. The microcomputer 3 serves as a controller for the key matrix circuit 2.

For reception of a remote control signal, a separately provided remote control receiving module 6 receives the remote control signal from a remote control transmitter 5, whereupon an encoded signal is extracted by removing a carrier wave from the received remote control signal, and then transmitted to the microcomputer 3 via a remote control transmission line 7, which is provided independently of the serial communication lines 4 for key data transmission.

The microcomputer 3 receives the encoded signal transmitted via the transmission line 7 at its interrupt terminal INT, and processes the encoded signal through an interrupt handling procedure.

Since the LSI, which constitutes the key input processing circuit 1, also incorporates a display driver, by inputting display data from the microcomputer 3 via one of the transmission lines 4 to the LSI (that is, a key input processing circuit 1), it is possible to drive a connected display 8.

As described above, conventionally, a communication line for transmitting key input data from the key matrix circuit 2 to the microcomputer 3 and a transmission line for transmitting the encoded signal from a remote-controller to the microcomputer 3 are different. Therefore, the conventional processing circuit has a problem in that the number of connecting lines between the circuit and the microcomputer are inevitably increased in order to allow incorporation of a remote control signal.

In particular, in a case of a stereo for use in a vehicle, since the key input processing circuit 1 and the remote control receiving module 6 are mounted on a front panel circuit board, while the microcomputer 3 is mounted on the main circuit board of the stereo, the number of connecters for connecting the connecting lines is also increased, as the number of connecting lines increases.

Moreover, as it may additionally control a CD player, a CD changer, a logic deck and so forth, as well as carrying out bus communication with external components, the microcomputer 3 is likely to be made unable to execute interrupt handling with respect to a remote control signal which has been input without prior notice, and therefore its function of receiving remote control data is impaired.

SUMMARY OF THE INVENTION

This invention has been conceived to overcome the above problems involved in the prior art. For this purpose, the present invention provides a key input processing circuit comprising a key scanning circuit connected to a key matrix circuit, for scanning the key matrix circuit to fetch key input data; a remote control decoder for decoding an encoded signal supplied from a remote control receiving means to generate remote control data; and a transmission register for selectively receiving either the key input data from the key scanning circuit or the remote control data from the remote control decoder, and for serially transmitting the received data in response to a synchronous clock.

In the present invention, by serially transmitting the key input data from the key matrix circuit, and the remote control data from the remote-controller via a common transmission register, the microcomputer can incorporate any of the above two kinds of data via a common interface.

Since the key input data from the key matrix circuit and the remote control data from the remote-controller are serially transmitted via a common transmission register, it is possible to simplify a circuit structure, while being able to respond to remote control signals without increasing the number of communication lines. Further, since the microcomputer does not need to execute interrupt handling, the microcomputer has a lower processing burden.

DESCRIPTION OF THE PREFERRED EMBODIMENTS

Figure 1:
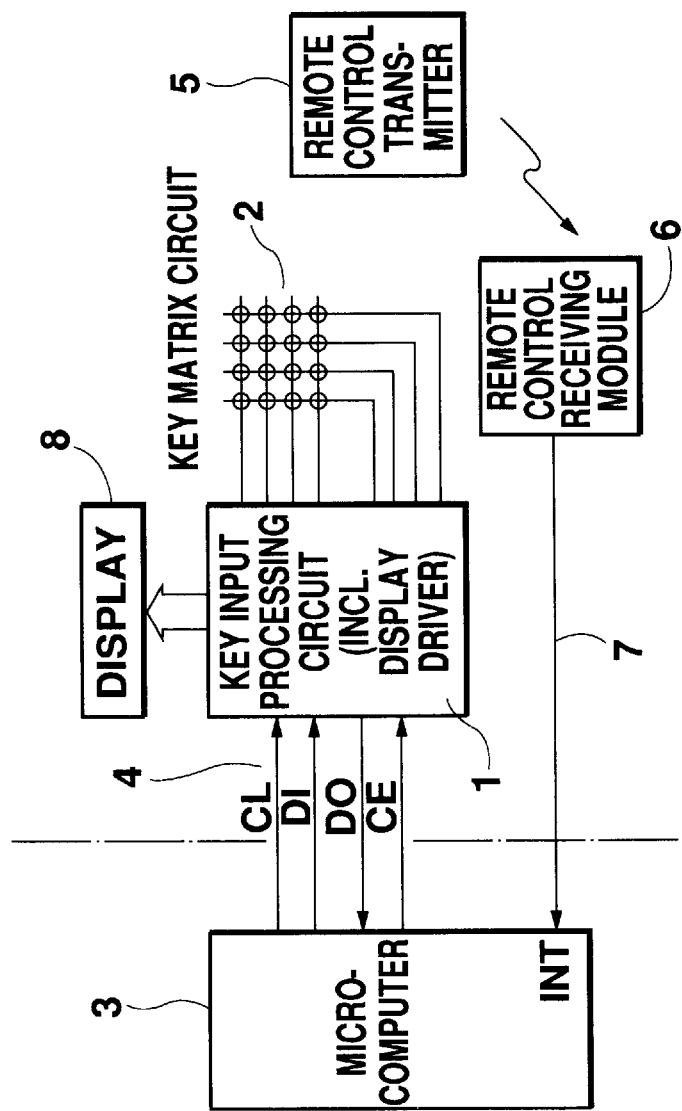
FIG. 1 is a block diagram showing a configuration of a prior art.
Figure 2:
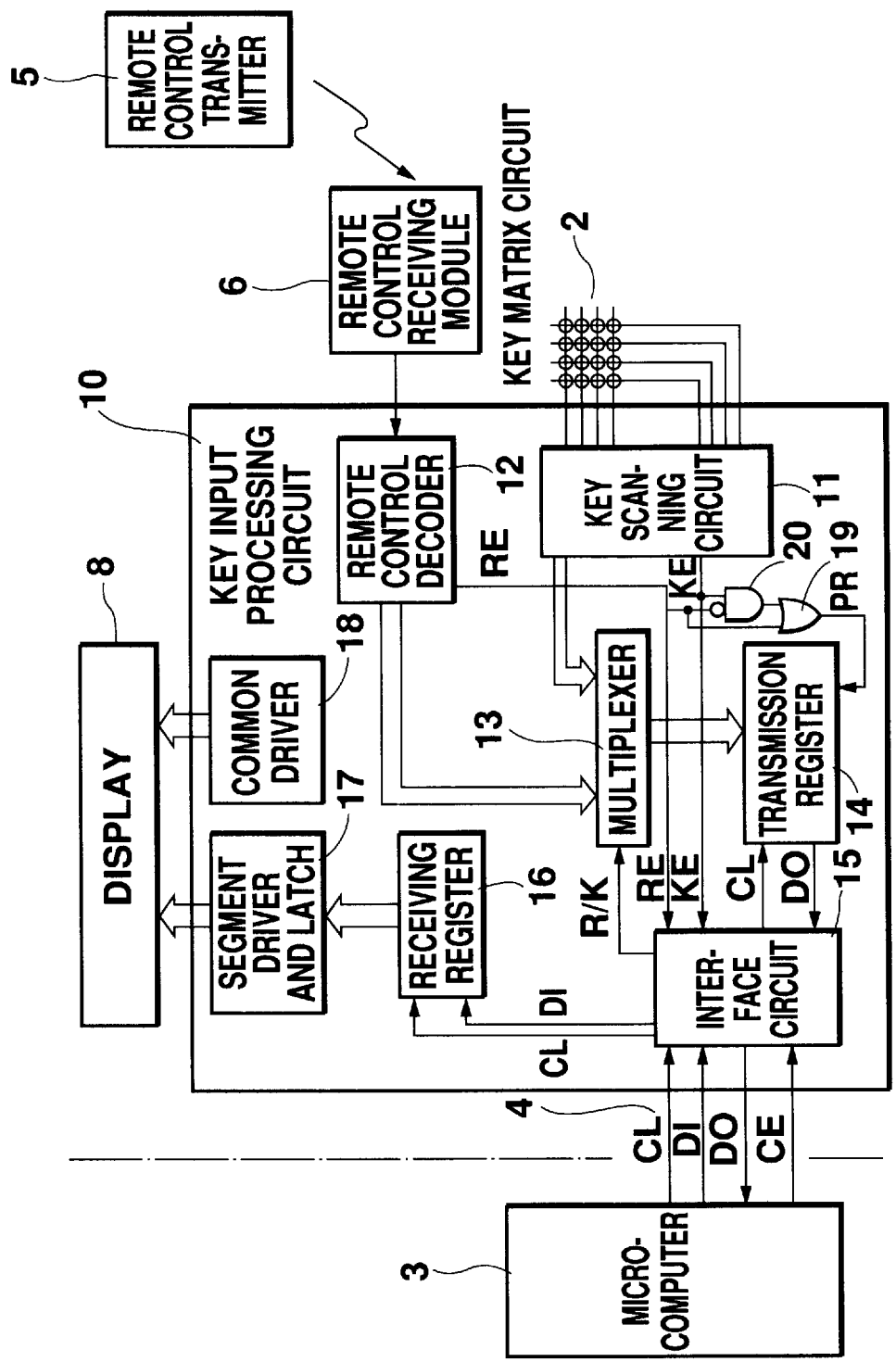
FIG. 2 is a block diagram showing a preferred embodiment of the present invention.

FIG. 2 is a block diagram showing the configuration of a preferred embodiment of the present invention, including an LSI 10 constituting a key input processing circuit, to which a remote control receiving module 6 for receiving a remote control signal from a remote control transmitter 5, a key matrix circuit 2, and a display 8, such as an LCD panel, are connected.

In a case of a stereo for use in a vehicle, the above components are all mounted on a front panel circuit board, while connecting to the microcomputer 3 mounted on the main circuit board of the stereo via only four communication lines 4.

The key input processing circuit 10 includes a key scanning circuit 11 for scanning the key matrix circuit 2 to obtain (fetch) key input data corresponding to the pressed key; a remote control decoder for decoding an encoded signal extracted by removing a carrier wave from a remote control signal received by the remote control receiving module 6, to generate remote control data; a multiplexer for receiving the key input data from the key scanning circuit 11 and the remote control data from the remote control decoder 12, and for selectively outputting either one of the received data; a transmission register for being set with the data selectively output from the multiplexer 13, and for serially transmitting the set data in synchronism with an input clock CL; an interface circuit 15 for interfacing between the processing circuit 10 and the microcomputer 3; a receiving register 16 for receiving display data transmitted from the microcomputer 3; a segment driver and latch 17 for latching the content of the receiving register 16, and for driving the display 8 according to the latched content; and a common driver 18 for driving a common electrode of the display 8 at a predetermined timing.

Figure 3:
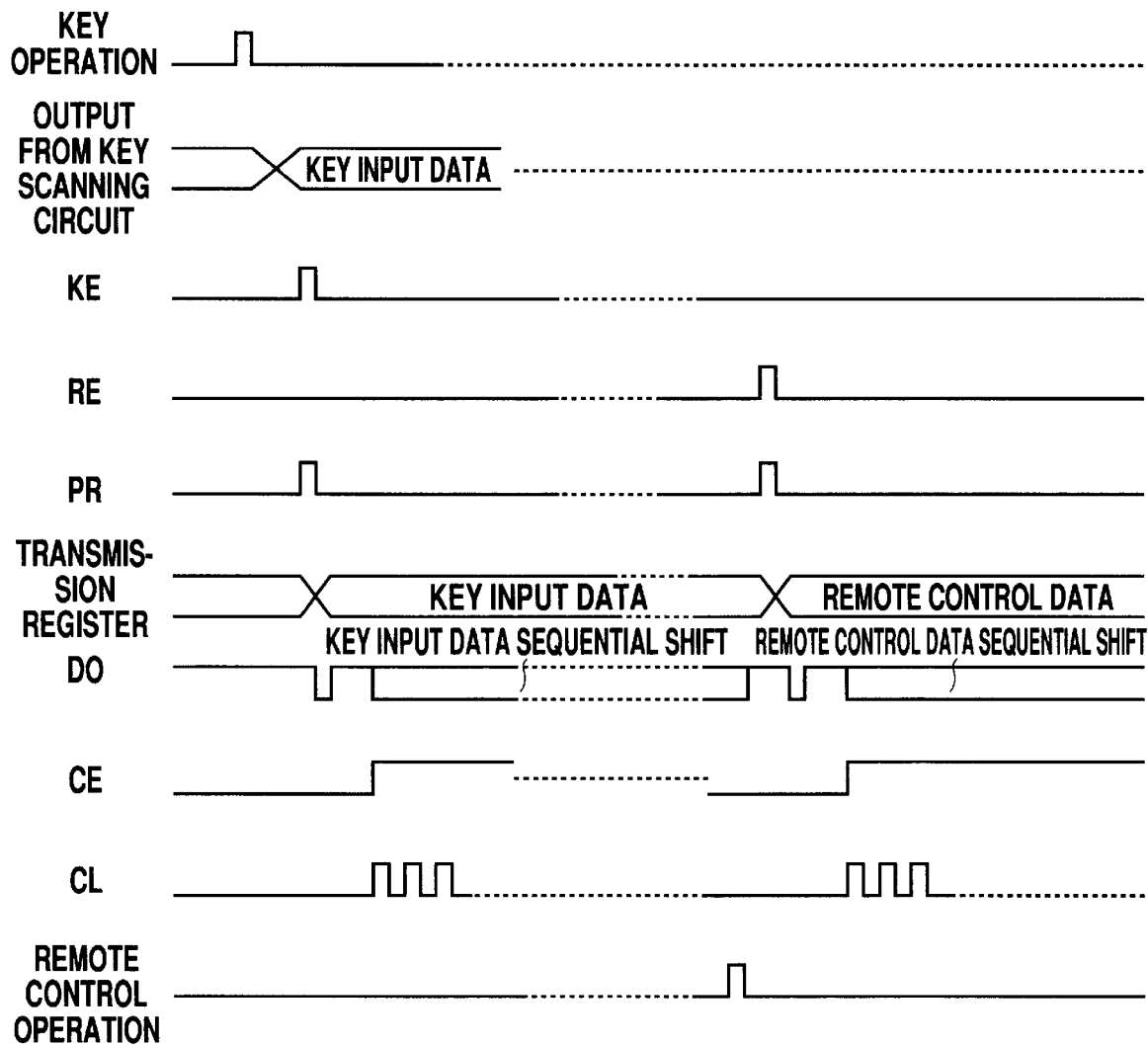
FIG. 3 is a timing chart explaining the operation of the preferred embodiment of the present invention.

The operation of the preferred embodiment will next be described with reference to FIG. 3.

Upon pressing of any of the keys in the key matrix circuit 2, the key scanning circuit 11 initiates its operation for scanning the key matrix circuit 2 to fetch key input data. Upon completion of fetching the key input data, the key scanning circuit 11 outputs a completion signal KE, which is applied to the transmission register 14 as a pre-set signal PR via an AND gate 20 and an OR gate 19. Upon reception of the completion signal KE by the transmission register 14, the key input data, which have been generated by the key scanning circuit 11, are selected by the multiplexer 13, which is so configurated as to normally select key input data, and further supplied to and set in the transmission register 14, when an end signal RE is not output from the remote control decoder 12.

On the other hand, when the remote control transmitter 5 is operated, a remote control signal comprising an encoded signal superimposed on a carrier wave, is received by the remote control receiving module 6, whereupon the encoded signal is extracted by removing the carrier wave.

The encoded signal is decoded by the remote control decoder 12, which in turn outputs the decoded signal as remote control data to the multiplexer 13. The remote control decoder 12 also outputs an end signal (completion) RE indicative of the completion of a decoding operation, which is applied to the transmission register 14 as a pre-set signal PR via the OR gate 19.

Although it normally selects key input data as described above, the multiplexer 13 is switched between selection of remote control data and key input data depending on the condition of a switch signal R/K, which varies in response to the end signal RE, and upon receipt of the end signal RE from the remote control decoder 12, remote control data is selected, irrespective of the existence/non-existence of a completion signal KE. In other words, remote control data have priority over key input data for the selection by the multiplexer 13. In this way, remote control data, which have been generated by decoding an encoded signal in the remote control decoder 12, are selected by the multiplexer 13 and further transmitted to, and set in, the transmission register 14.

As described above, the data from the key scanning circuit 11 and the data from the remote control decoder 12 are selectively set in the common transmission register 14.

Serial transmission of data from the transmission register 14 to the microcomputer 3 will be described next.

Upon acknowledgement of the fact that the transmission register 14 has been set with data in accordance with the signal RE or KE, the interface circuit 15 changes a data out signal DO of a third line of the communication lines 4 from an H level to an L level so as to transmit a read request to the microcomputer 3, which is mounted on the main circuit board of the stereo. Upon receipt of the request, the microcomputer 3 sets a chip enable signal CE of a fourth line of the communication lines 4 at an H level and sends it to the interface circuit 15, and then outputs a synchronous clock CL via a first line of the communication lines 4. Subsequently, upon detection of the chip enable signal CE at an H level, the interface circuit 15 applies the synchronous clock CL from the microcomputer 3 to the transmission register 14, so that the content of the transmission register 14 are sequentially shifted in synchronism with the supplied synchronous clock CL, and the latched content of the transmission register 14 is then transmitted to the microcomputer 3 as DO data via the third line of the communication lines 4.

As described above, key input data and remote control data are serially transmitted to the microcomputer 3 via a second line of the communication lines 4, and received by the microcomputer 3 through identical processing. With this arrangement, the microcomputer 3 does not need to execute interrupt handling exclusively for remote control, contrary to the prior art.

For the transmission of display data, the microcomputer 3 sets and transmits the chip enable signal CE at an H level via the fourth line of the communication lines 4, and outputs a synchronous clock via the first line of the communication lines 4 and display data as an input data DI via the second line of the communication lines 4. Upon detection of the chip enable signal CE at an H level, the interface circuit 15 applies the synchronous clock CL and display data, both from the microcomputer 3, to a receiving register 16, so that the receiving register 16 serially receives the display data in synchronism with the synchronous clock CL. The received display data are then further supplied to a segment driver & latch 17, which drives a display 8 in cooperation with a common driver 18, for displaying according to the display data.

What is claimed is:

1. A processing circuit for an input signal from a key or a remote-controller, the processing circuit comprising:

a key scanning circuit connected to a key matrix circuit to generate key input data in response to the key matrix circuit;

a remote control decoder for decoding an encoded signal supplied from a remote control receiving circuit to generate remote control data; and a transmission register for selectively storing at least one of the key input data from the key scanning circuit and the remote control data from the remote control decoder, and for transmitting the stored data, wherein the transmission register is a shift register having an output, and the stored data are transmitted through the output in response to an external clock.

2. A processing circuit according to claim 1, further comprising:

a multiplexer connected to both the key scanning circuit, which generates the key input data, and the remote control decoder, which generates the remote control data, for selectively outputting either the key input data or the remote control data.

3. A processing circuit according to claim 2, wherein the key scanning circuit outputs a first completion signal indicative of completion of a fetching operation with respect to the key input data, the remote control decoder outputs a second completion signal indicative of completion of a decoding operation with respect to the encoded signal, and the multiplexer operable in response to at least one of the first completion signal and the second generation completion signal to process one of the key input data and the remote control data.

4. A processing circuit according to claim 3, wherein the data from the multiplexer are set in the transmission register according to either the first or second generation completion signal.

5. A processing circuit according to claim 4, further comprising:

an interface circuit connected to the transmission register, for communicating with an external microcomputer, wherein the external clock output from the external microcomputer is supplied to the transmission register through the interface circuit, and the data output from the transmission register is supplied to the external microcomputer via the interface circuit.

6. A processing circuit for an input signal from a key or a remote-controller, the processing circuit comprising:

key input data generation means for generating key input data according to key operations;

remote control data generation means for generating remote control data corresponding to operations of a remote control transmitter;

storing means for selectively storing at least one of the key input data and the remote control data in response to output signals of the key input data generation means and the remote control data generation means; and transmission means for transmitting the data stored in the storing means to a data processor.

7. A processing circuit operable with a keyboard and a remote controller, the processing circuit comprising:

a key decoder connected to the keyboard, the key decoder generating a key input signal and a first control signal in response to the keyboard;

a remote control decoder generating a remote control signal and a second control signal in response to the remote controller;

an interface circuit for outputting a third control signal in response to the first control signal and the second control signal;

a multiplexer for outputting at least one of the key input signal and the remote control signal in response to the third control signal; and a transmission register for transmitting data from the multiplexer through a common output line.

8. A processing circuit of claim 7, further comprising a processor providing a clock signal to the transmission register for receiving the data from the transmission register in response to the clock signal.

9. A processing circuit of claim 7, wherein the transmission register is a shift register.

10. A processing circuit of claim 7, wherein the interface circuit prioritize the first and second control signals so that the multiplexer outputs the remote control data over the key input data.

* * * * *

UNITED STATES PATENT AND TRADEMARK OFFICE
CERTIFICATE OF CORRECTION

PATENT NO.   :   5,892,459
DATED        :   April 6, 1999
INVENTOR(S)  :   Shizuka Ishimura It is certified that error appears in the above-identified patent and that said Letters Patent is hereby corrected as shown below:

On the title page, item [*], "Pat. No. 5," should read
--Pat. No. 5,752,184--.

Signed and Sealed this

Twenty-eighth Day of September, 1999

Attest:

Q. TODD DICKINSON

*Attesting Officer*   *Acting Commissioner of Patents and Trademarks*